United States Patent [19]
Watkins

[11] Patent Number: 6,009,470
[45] Date of Patent: Dec. 28, 1999

[54] ENCODED MULTI-MEDIA TERMINAL

[75] Inventor: Daniel Watkins, Saratoga, Calif.

[73] Assignee: LSI Logic Corporation, Milpitas, Calif.

[21] Appl. No.: 08/926,560

[22] Filed: Sep. 10, 1997

[51] Int. Cl.$^6$ ................................................. G06F 15/76
[52] U.S. Cl. ........................ 709/231; 709/201; 709/202; 709/203
[58] Field of Search ................................. 709/201, 202, 709/203, 231

[56] References Cited

U.S. PATENT DOCUMENTS

| | | | |
|---|---|---|---|
| 4,243,984 | 1/1981 | Ackley et al. | 340/703 |
| 5,247,614 | 9/1993 | Eagen et al. | 395/200 |
| 5,440,744 | 8/1995 | Jacobson et al. | 395/650 |
| 5,442,749 | 8/1995 | Northcutt et al. | 395/200.09 |
| 5,453,980 | 9/1995 | Van Engelshoven | 370/60.1 |
| 5,511,003 | 4/1996 | Agarwal | 364/514 R |
| 5,586,312 | 12/1996 | Johnson et al. | 395/610 |
| 5,619,710 | 4/1997 | Travis, Jr. et al. | 395/800 |
| 5,790,792 | 8/1998 | Dudgeon et al. | 395/200.42 |
| 5,848,246 | 12/1998 | Gish | 395/200.58 |

*Primary Examiner*—Frank J. Asta
*Assistant Examiner*—Stephan Willett
*Attorney, Agent, or Firm*—Conley, Rose & Tayon, PC; B. Noel Kivlin

[57] ABSTRACT

An encoded multimedia terminal having a low cost decompression circuit together with a low cost interconnect circuit coupled to a powerful server. The terminal can accept user input via a mouse, keyboard, remote control, or handset. In one embodiment, the server has ports which provide real-time audio and video encoding of source material based on user edits and the original source. An encoded bitstream is then sent to the encoded multimedia terminal for decoding. Broadly speaking, the present invention contemplates an encoded multimedia terminal comprising a microcontroller, a network interface, a multimedia bitstream decoder, and a display controller. The microcontroller receives input from a user-input device and responsively determines a user input signal. The network interface is coupled to the microcontroller to receive the user input signal and is configured to communicate the user input signal to a multitasking server which is executing a software application. The software application accepts the user input signal and responsively updates a video display, and the multitasking server converts the video display to a multimedia bitstream and communicates the multimedia bitstream to the network interface. The multimedia bitstream decoder is coupled to the network interface to receive the multimedia bitstream and is configured to convert the multimedia bitstream into a digital video signal. The display controller is coupled to the multimedia bitstream decoder to receive the digital video signal and is configured to responsively provide a display signal to a display screen. The multimedia bitstream may be DVD-compliant.

4 Claims, 5 Drawing Sheets

ENCODED MULTI-MEDIA TERMINAL

BACKGROUND OF THE INVENTION

1. Field of the Invention

This invention relates to the field of computer networks, and in particular to a low-cost multimedia-driven computer network.

2. Description of the Related Art

Computer networks have been in existence for many years. The earliest networks were built using "dumb" terminals coupled to a powerful mainframe computer that serviced terminal users on a time-sharing basis. The "dumb" terminals consisted of little more than a keyboard, a CRT, and a network interface. The capabilities of these terminals were limited to simple text and line-feed operation.

More recently, computer networks have been formed from workstations, personal computers, and network computers. These computer networks typically operate in a Client/Server framework in which many clients (workstations, personal computers, network computers) connect to a single server or set of servers. The servers are powerful computers that provide what the client needs, such as access to databases, the internet, and application programs.

Network computers are considered to be "thin clients" because they have less capability than personal computers or workstations. Except perhaps for the network computers, these modem computers support a significant multimedia capability. Each of these systems includes complex microprocessors, memory, and system components which contribute to a substantial cost. Even though recent network computers may eventually achieve a sharply reduced cost, they are still quite sophisticated systems which have to support complete operating systems and execute user applications (e.g. Java applets).

It would be desirable to have a distributed display terminal system that has real-time display and audio with all the responsiveness that a full workstation, personal computer, or network computer system would have, at low cost and low complexity. It would also be desirable to provide this distributed display terminal system with scalability, portability, and versatility which is independent of future generation computer capabilities.

SUMMARY OF THE INVENTION

The problems outlined above are in large part solved by an encoded multimedia terminal having a low cost decompression circuit together with a low cost interconnect circuit coupled to a powerful server. The terminal can accept user input via a mouse, keyboard, remote control, or handset. In one embodiment, the server has ports which provide real-time audio and video encoding of source material based on user edits and the original source. An encoded bitstream is then sent to the encoded multimedia terminal for decoding.

Broadly speaking, the present invention contemplates an encoded multimedia terminal comprising a microcontroller, a network interface, a multimedia bitstream decoder, and a display controller. The microcontroller receives input from a user-input device and responsively determines a user input signal. The network interface is coupled to the microcontroller to receive the user input signal and is configured to communicate the user input signal to a multitasking server which is executing a software application. The software application accepts the user input signal and responsively updates a video display, and the multitasking server converts the video display to a multimedia bitstream and communicates the multimedia bitstream to the network interface. The multimedia bitstream decoder is coupled to the network interface to receive the multimedia bitstream and is configured to convert the multimedia bitstream into a digital video signal. The display controller is coupled to the multimedia bitstream decoder to receive the digital video signal and is configured to responsively provide a display signal to a display screen. The multimedia bitstream may be DVD-compliant.

The present invention further contemplates an encoded multimedia server comprising an edit decoder, a processor, and a video encoder. The edit decoder receives a user input signal from an encoded multimedia terminal and responsively determines a user edit. The processor is coupled to the edit decoder to receive the user edit and is configured to execute a software application associated with the encoded multimedia terminal. The software application processes the user edit and responsively updates a video display. The video encoder is operatively coupled to the processor to receive the video display and is configured to convert the video display into a multimedia bitstream for communication to the encoded multimedia terminal. The encoded multimedia terminal converts the multimedia bitstream into a display signal for a display screen. The multimedia bitstream may be DVD-compliant.

The present invention also contemplates encoded multimedia network comprising an encoded multimedia terminal coupled to an encoded multimedia server.

BRIEF DESCRIPTION OF THE DRAWINGS

Other objects and advantages of the invention will become apparent upon reading the following detailed description and upon reference to the accompanying drawings in which.

Figure 1:
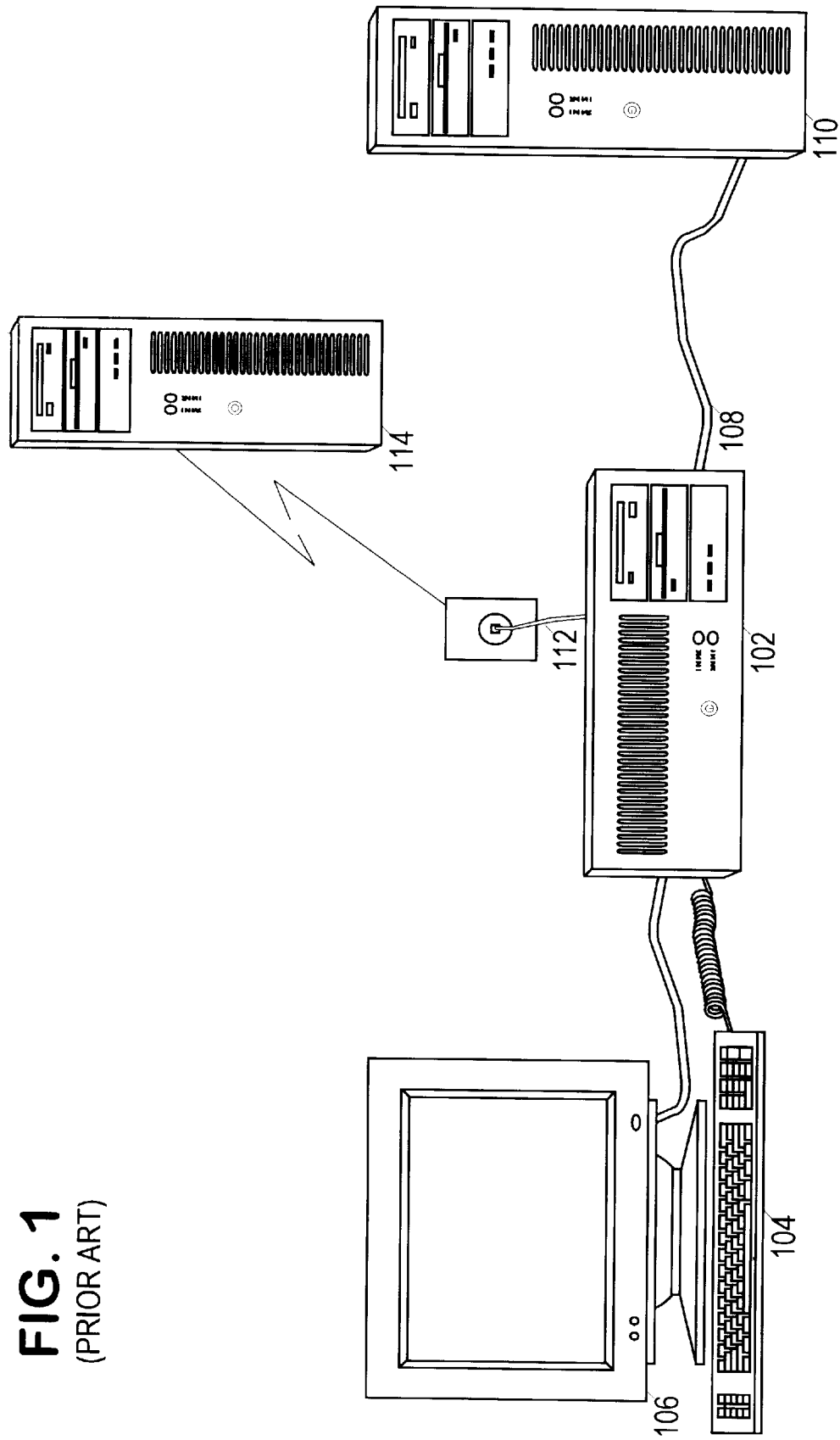
FIG. 1 shows a modern computer network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. I shows a computer network. A personal computer 102 accepts input from a user-input device 104 and provides visual feedback via a video display screen 106. The personal computer 102 may be in communication with a local server 110 via a local office interconnect 108, or it may be in communication with a remote server 114 via a phone connection 112. One of the servers 110, 114 may be executing a software application for the user of personal computer 102. The personal computer 102 executes an interface application that sends the user input to the server 110, 114 where the software application processes it and responsively transmits instructions back to the personal computer 102 for the interface application to process and generate a video display on screen 106. This approach is taken to address bandwidth restrictions of many network channels, e.g. phone line 112, but it requires sophisticated (i.e. expensive) computers on both ends of the network connection.

Figure 2:
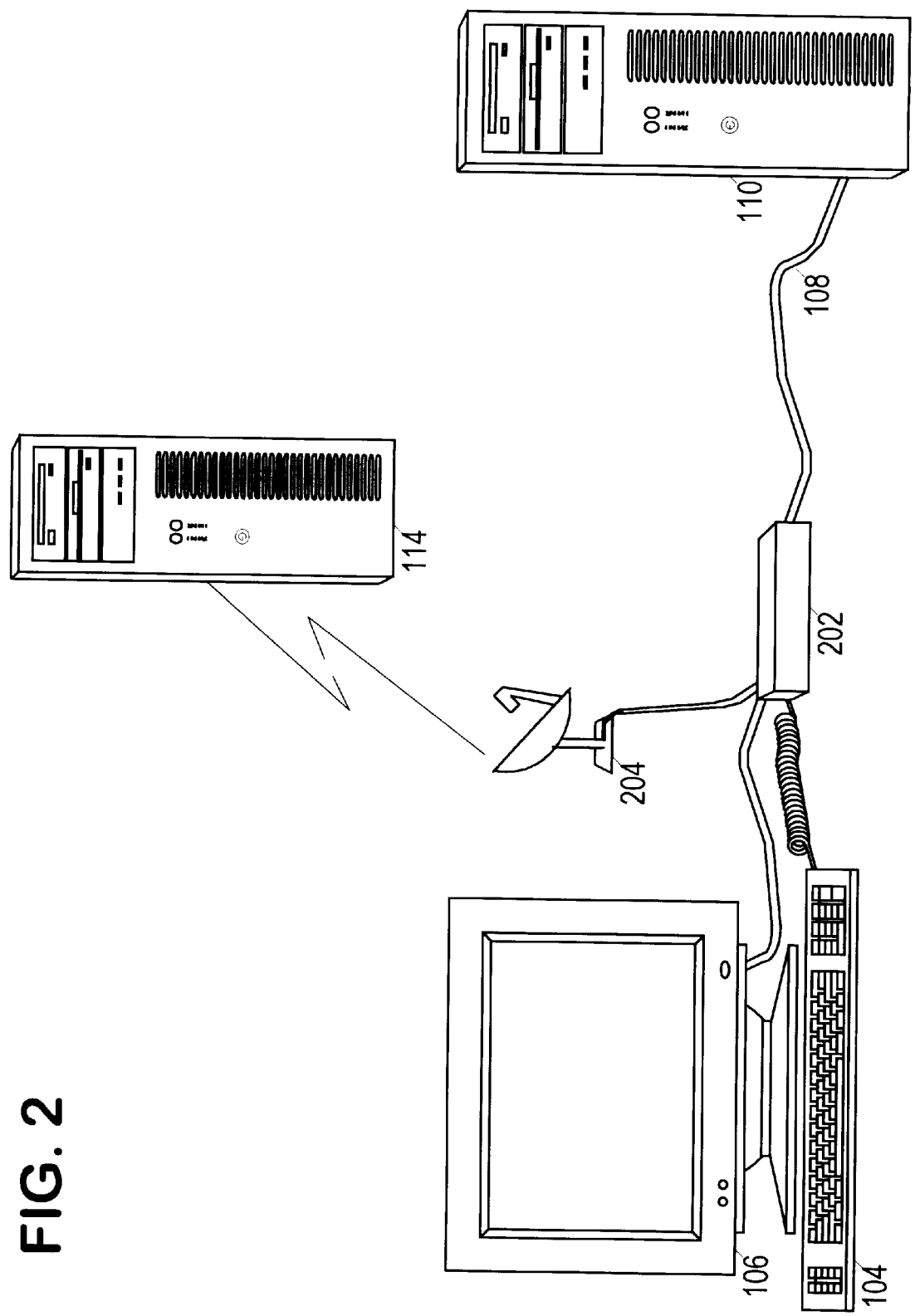
FIG. 2 shows an encoded multimedia network.

Turning now to FIG. 2, an encoded multimedia terminal 202 accepts input from a user-input device 104 and sends the input to local server 110 via a local office interconnect, or to remote server 114 via a network channel. One of the servers 110, 114 is executing a software application for the user of encoded multimedia terminal 202. The software application processes the user input and generates a video display for screen 106. The server 110, 114 compresses the video display into an encoded multimedia sequence and transmits the encoded multimedia sequence to encoded multimedia terminal 202 via a high bandwidth network channel 204. Encoded multimedia terminal 202 receives and decodes the encoded multimedia sequence to show the video display on screen 106. Encoded multimedia terminal 202 can be built using few, low-cost components and hence can be a very economical way to provide users with access to a computer network that provides all the real-time responsiveness of full-powered personal computers.

Examples of user-input devices 104 include: a handset, a joystick, a keyboard, a light pen, a microphone, a mouse, a remote control, a touch-screen, a trackball, and a video camera. Some of these, particularly the microphone (for voice recognition) and the video camera (for motion recognition) may require additional processor hardware in the encoded multimedia terminal 202 to convert the sound and video to acceptable user inputs.

It may be preferred that the high bandwidth channel 204 have a capacity for more than 10 Mb/s (mega-bits per second). Examples of such channels include: satellite transmission links, cable modems, Ethernet, Fibre channel, and IEEE 1394. A high bandwidth is not required for transmitting the user input to the server, hence a lower capacity channel such as a modem may be used. However, it is understood that the high bandwidth channel 204 may be designed to provide for a low bandwidth user signal transmission to the server.

Examples of video display screens 106 include: televisions, computer monitors, LCD/LED flat panel displays, and projection systems. The system may also include audio capability, so that audio programs generated by the software application are compressed into the multimedia bitstream for decoding and playback at the terminal 202. Audio devices such as speakers, headphones, and audio recorders would be suitable for reproducing the audio program.

Figure 3:
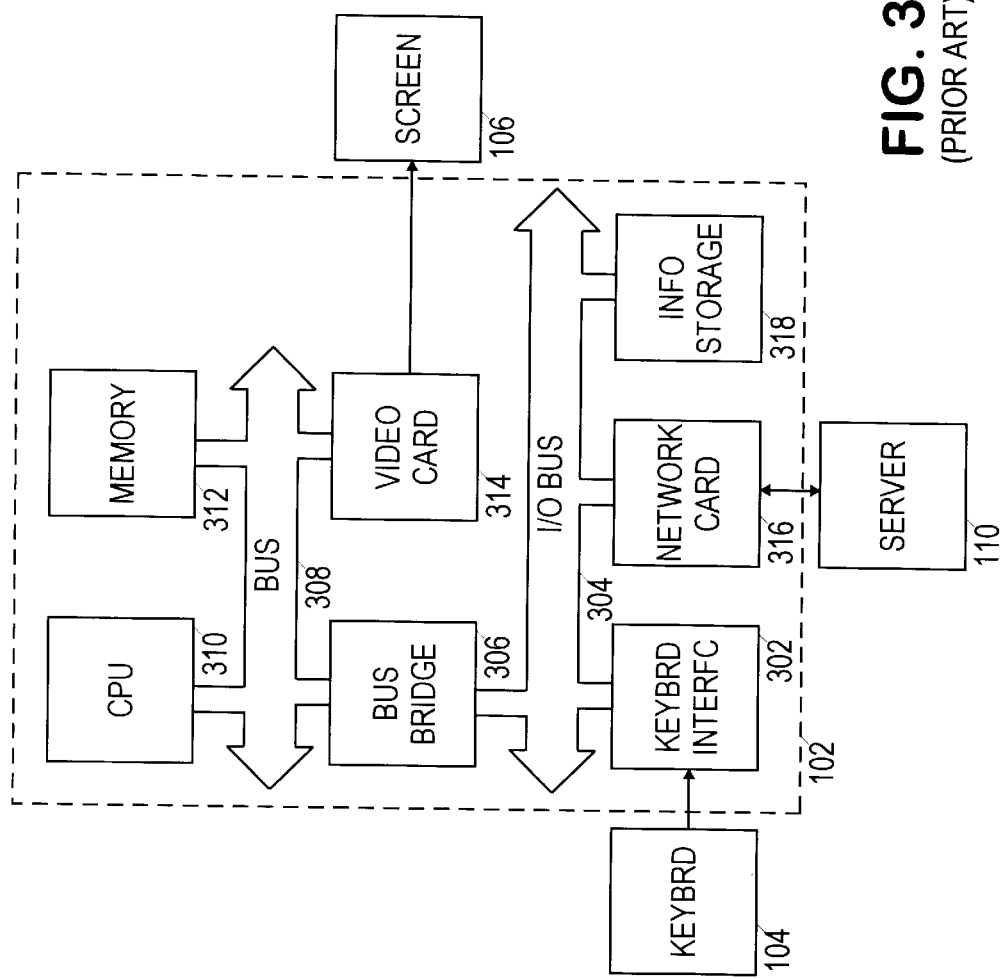
FIG. 3 is a functional block diagram of a personal computer architecture.

Turning now to FIG. 3, a functional block diagram of personal computer 102 is shown. Input from user input device 104 is captured by a user-input device interface 302 and stored until CPU 310 retrieves the user input via CPU bus 308, bus bridge 306, and I/O bus 304, and stores it in memory 312 via CPU bus 308. An interface application in memory 312 being executed by CPU 310 transfers the user input via CPU bus 308, bus bridge 306, I/O bus 304 and network card 316 to server 110. A software application being executed by server 110 processes the user input and sends update instructions to personal computer 102. Network card 316 sends the update instructions to CPU 310 via the bus bridge and busses, and the interface application being executed by the CPU 310 processes the update instructions to create a video display, which is displayed on screen 106 by video card 314. Typically, personal computer 102 also requires an information storage medium 318 for storing software and configuration information.

Figure 4:
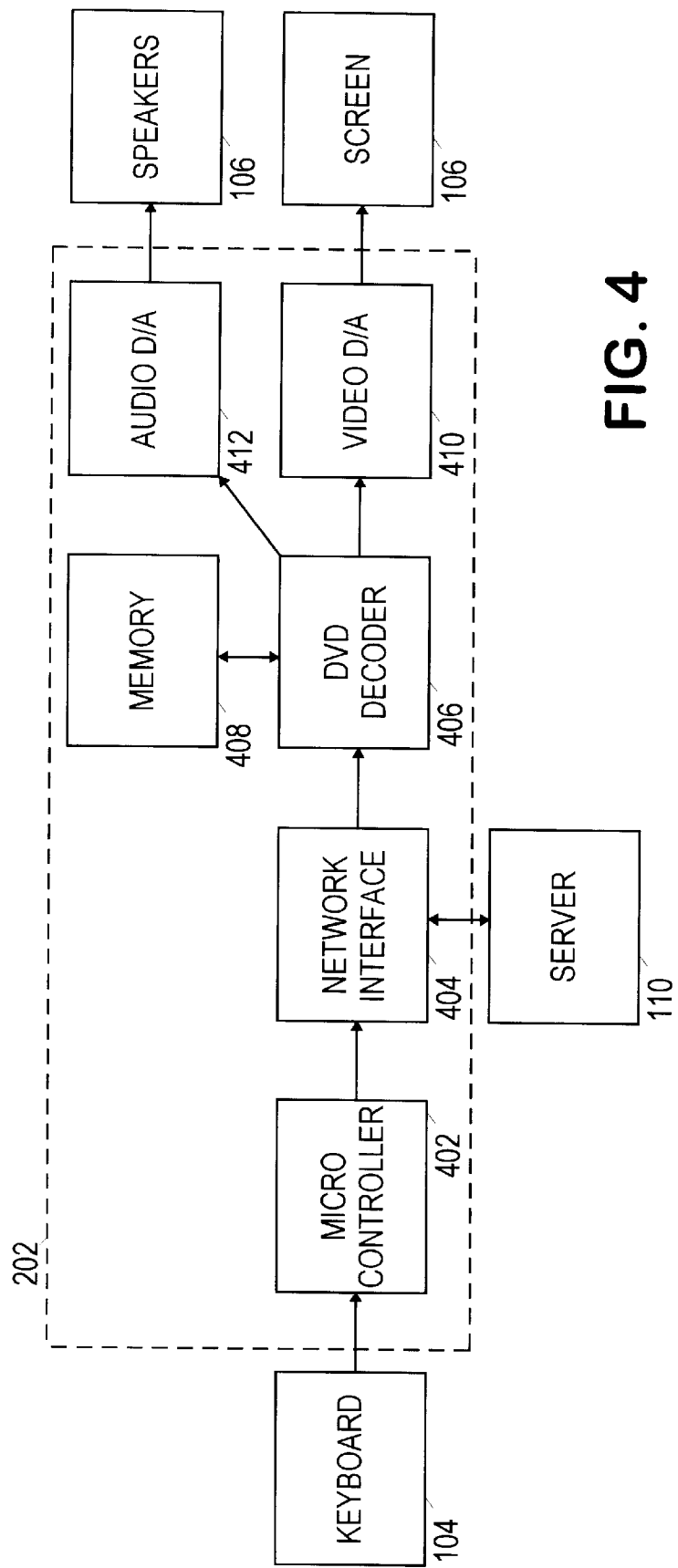
FIG. 4 is a functional block diagram of an encoded multimedia terminal.

Turning now to FIG. 4, a functional block diagram of encoded multimedia terminal 202 is shown. Input from user-input device 104 is converted to a user input by microcontroller 402 and sent to network interface 404. Network interface 404 communicates the user input to server 110. A software application executed by the server 110 processes the user input and responsively updates a video display. The server then compresses the video display into an encoded multimedia bitstream which is communicated back to the network interface 404. The network interface 404 provides the encoded multimedia bitstream to a multimedia bitstream decoder 406. One example of a multimedia bitstream decoder 406 is a DVD decoder. Multimedia bitstream decoder 406 decodes the encoded multimedia bitstream to produce a sequence of video frames. Anchor video frames are stored in memory 408 and are used to decode predictive and bidirectional frames which are encoded relative to these anchor frames. The sequence of video frames is provided in the form of a digital video bitstream to video digital-to-analog converter 410. Video D/A 410 converts the digital video bitstream into a video signal suitable for showing the video display on video screen 106. Video D/A 410 is typically an NTSC/PAL rasterizer for television, but may also be a RAMDAC for other types of video screens.

The software application running on server 110 may also provide an audio program which the server compresses into the encoded multimedia bitstream. The multimedia bitstream decoder 406 also decodes the audio program and provides a digital audio signal to audio digital-to-analog converter 412. Audio D/A 412 converts the digital audio signal into an analog audio signal which reproduces the audio program via speakers 106.

The microcontroller 402 can be a simple UART (universal asynchronous receiver/transmitter) able to sense a keystroke or joystick motion and configured to transmit an "action" code that corresponds to the sensed action. Alternatively, the microcontroller 402 may subsume some of the network interface functionality, and be a simple processor which executes software device drivers for the interface and decoder hardware. A EEPROM memory may be coupled to the microcontroller to provide such software drivers.

Encoded multimedia terminal 202 may also include a video buffer for buffering video sequences. This would be particularly desirable for networks that use burst-communications. The encoded multimedia terminal 202 may further include recordable drives or other information storage devices (not shown) for archiving a session. This might be desirable for authors of DVD disks.

Figure 5:
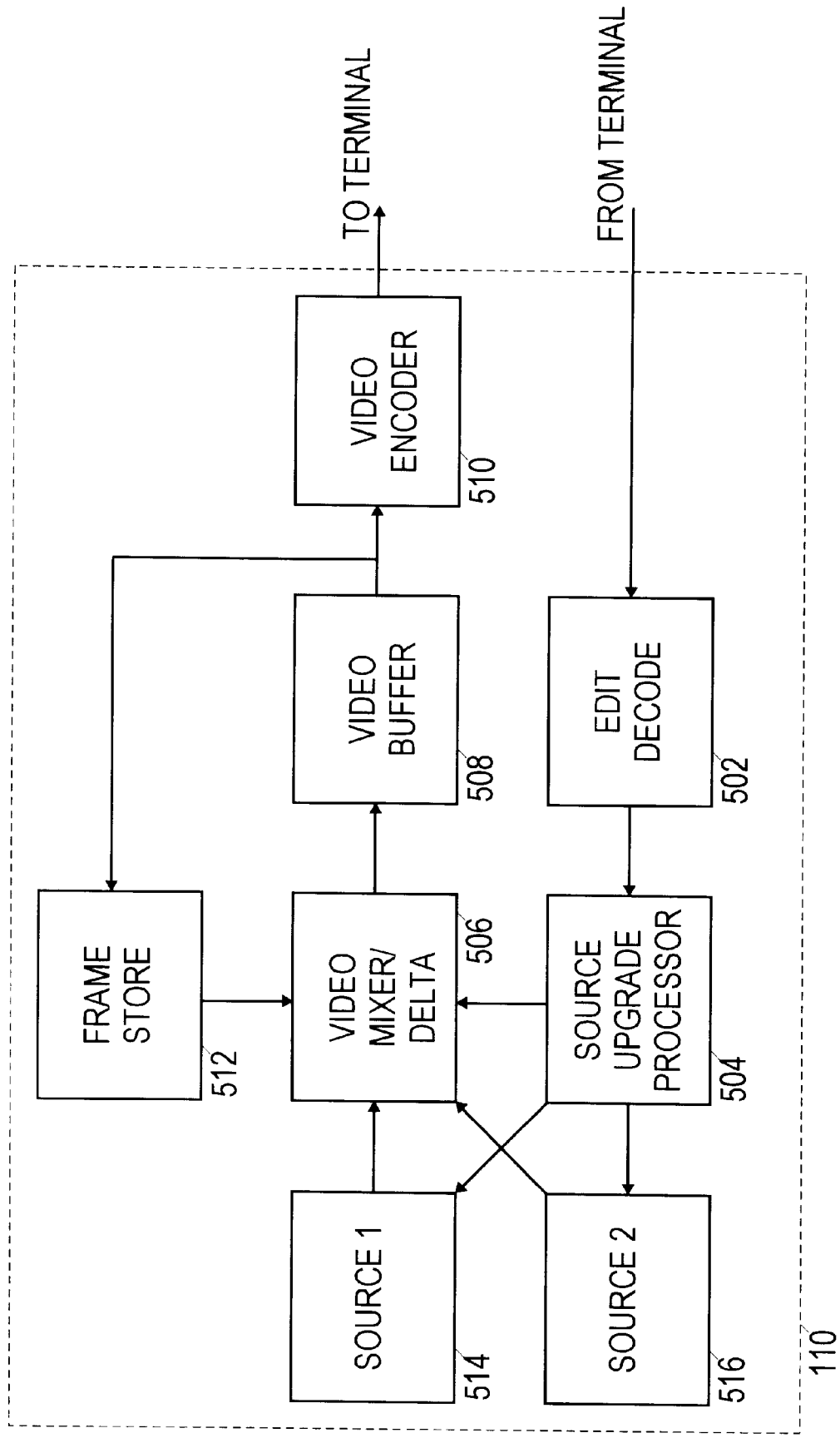
FIG. 5 is a functional block diagram of an encoded multimedia server port.

Turning now to FIG. 5, a functional block diagram of an encoded multimedia server port is shown. In one embodiment, an edit decoder 502 receives a user input signal from the encoded multimedia terminal and converts it to an edit. Examples of possible edits might be "move the cursor up", "select highlighted item", or "return to previous screen". In another embodiment, the edit decoder 502 may receive a user input signal and convert it into hardware peripheral signals that a standard microprocessor interface would expect. Examples of such hardware peripheral signals might be keystroke signals from a keyboard or serial mouse signals.

A source upgrade processor 504 responds to the output of the edit decoder 502 by modifying a video display. The video display comprises a sequence of video frames, and each frame is typically formed from one or more source images. A first source image 514 (e.g. a background desktop) and a second source image 516 (e.g. a mouse cursor) may be combined to form a video frame by overlaying the second source image at a specified location on the first source image. A video mixer 506 performs the overlay in response to signals from the source upgrade processor 504. The source upgrade processor can modify the source images and specify how they are to be combined (e.g. specify the cursor position). The video mixer 506 may be configured to compare the combined frame with a previous frame stored in a frame store 512 and generate a delta frame if the differences between the frames are small. The video mixer 506 then sends either the combined frame or the delta frame via a video buffer 508 to a video encoder 510. The video encoder 510 receives a sequence of combined and delta frames representing a video display, and compresses the sequence into an encoded multimedia bitstream for transmission to the encoded multimedia terminal.

In one embodiment, the first source image 514 may be an image stored in a memory device, and the second source image 516 may be provided by a custom graphics circuit (e.g. a three dimensional object graphics rendering circuit). The image sources may be optimized to deliver the image data in a format suitable for the video encoder, rather than in a format more suited for a display screen. For example, the image may be provided in blocks rather than scan lines, and may use a 4:2:0 color sampling format rather than a 4:2:2 color sampling format. Thus, a tighter coupling between graphics generation and video encoding is possible and would reduce hardware bandwidth and complexity, and would also reduce processing requirements.

The video mixer 506 may process the provided images in a rule based manner which may allow the video mixer 506 to scan only a restricted region of the video frames for image changes. For example, if user edits are occurring in only one region of the screen, this region can be defined by the software, and the video mixer 506 can reduce the amount of required processing by assuming no changes occur outside the defined region.

In one embodiment, the source upgrade processor 504 may be a simple, special purpose processor dedicated to tracking minor edits (such as cursor motion, 3D object manipulation, and/or text and data entry) which is coupled to a more powerful general purpose processor for saving old and accessing new source images. In another embodiment, source upgrade processor 504 may be a personal computer microprocessor executing a software application and responding to emulated user input in a normal manner (i.e. updating a video display using a video card interface). In yet another embodiment, source upgrade processor 504 may be a powerful multitasking processor which responds to multiple encoded multimedia terminals with associated instantiations of one or more software applications in a timesharing fashion.

The video encoder 510 may be a DVD or MPEG encoder which sharply reduces the bandwidth requirements of real time video. This is achieved by various video compression features provided by DVD/MPEG. MPEG is a lossy compression scheme which uses color sub-sampling, motion compensation frame representation, discrete cosine transform coefficients, quantization, coefficient re-ordering, run-length encoding, and variable length encoding.

The encoded multimedia network may advantageously provide the features of a highly responsive, low cost, low complexity terminal with no local software applications or operating system, and which hence requires no administrative maintenance. The encoded multimedia terminal may further be scalable to MPEG4, be server-platform independent, and be easily upgraded for various different user input devices. Further, full-function computers may be easily programmed to interface with encoded multimedia servers. The encoded multimedia terminals may find application as game platforms, office and home terminals, and engineering workgroup terminals.

Numerous variations and modifications will become apparent to those skilled in the art once the above disclosure is fully appreciated. It is intended that the following claims be interpreted to embrace all such variations and modifications.

What is claimed is:

1. An encoded multimedia terminal comprising:

a microcontroller configured to receive input from a user-input device and configured to responsively determine a user input signal;

a network interface coupled to the microcontroller to receive the user input signal and configured to communicate the user input signal to a multitasking server, wherein the multitasking server is configured to execute a software application which accepts the user input signal and responsively updates a video display, wherein the multitasking server is configured to convert the video display to a DVD-compliant multimedia bitstream and to communicate the DVD-compliant multimedia bitstream to the network interface, wherein the DVD-compliant multimedia bitstream includes a sequence of delta frames derived from one or more image sources, wherein the image sources provide frames in macroblock form using a 4:2:0 color sampling format to a video mixer that combines said image source frames, wherein the video mixer compares an updated video display frame with a previous video display frame to generate a delta frame in the sequence of delta frames, wherein the network interface is configured to establish a connection with the server at power-on, and wherein the network interface is configured to establish the connection with the server when the terminal receives the user input signal if the connection with the server is not established;

a DVD multimedia bitstream decoder coupled to the network interface to receive the DVD-compliant multimedia bitstream and configured to convert the DVD-compliant multimedia bitstream into a digital video signal;

an audio digital-to-analog converter, wherein the multimedia bitstream includes an audio program, wherein the multimedia bitstream decoder decodes the audio program into a digital audio signal, and wherein the audio digital-to-analog converter responsively provides an audio output signal; and a display controller coupled to the DVD multimedia bitstream decoder to receive the digital video signal and configured to responsively provide a display signal to a display screen.

2. The encoded multimedia terminal of claim 1, wherein the user-input device is one of a set of user-input devices including: a handset, a joystick, a keyboard, a light pen, a microphone, a mouse, a remote control, a touch-screen, a trackball, and a video camera.

3. The encoded multimedia terminal of claim 1, wherein the network interface is configured to communicate with the multitasking server according to a communications standard which is one of a set of communications standards including: Ethernet, IEEE 1394, and Fibre Channel.

4. An encoded multimedia network comprising:

a first encoded multimedia terminal; and an encoded multimedia server which includes:

an edit decoder configured to receive a user input signal from an encoded multimedia terminal and configured to responsively determine an edit;

a processor coupled to the encoded multimedia terminal to receive a user input signal and configured to execute a software application associated with the encoded multimedia terminal, wherein the software application processes the user input and responsively updates a video display;

wherein the processor executes a separate instantiation of a software application for each encoded multimedia terminal coupled to the encoded multimedia server;

a video encoder operatively coupled to the processor to receive the video display and configured to convert the video display into a DVD-compliant multimedia bitstream for communication to the encoded multimedia terminal;

a first video display source coupled to the processor to receive updates and configured to responsively update a first video frame;

a second video display source coupled to the processor to receive updates and configured to responsively update a second video frame;

wherein the first and second video display sources are configured to provide the video frames to the video mixer in the form of macroblocks;

wherein the first and second video display sources are configured to provide the video frames to the video mixer using a 4:2:0 color sampling format;

a video mixer coupled to the first and second display sources, coupled to the processor, and configured to combine the first and second video frames to produce a combined video frame in accordance with parameters set by the software application, wherein the video display comprises a sequence of combined video frames;

a video frame memory configured to store a previous video display frame;

wherein the video mixer coupled to the processor and configured to process an updated video display frame, wherein the video mixer is further coupled to the video frame memory to compare the previous video display frame with the updated video display frame to generate a delta frame, wherein the video display comprises a sequence of updated video display frames and delta frames;

wherein the video mixer is configured by the processor to only compare a predetermined region of the updated video display frame with a corresponding predetermined region of the previous video frame to generate the delta frame;

wherein the first encoded multimedia terminal includes:

a microcontroller coupled to receive input from a user-input device and configured to responsively determine the user input signal;

wherein the user-input device is one of a set of a set of user-input devices including: a handset, a joystick, a keyboard, a light pen, a microphone, a mouse, a remote control, a touch-screen, a trackball, and a video camera;

a network interface coupled to the microcontroller to receive the user input signal, coupled to the encoded multimedia server to communicate the user input signal to the encoded multimedia server and to receive the DVD-compliant multimedia bitstream;

wherein the network interface is configured to communicate with the multitasking server according to a communications standard which is one of a set of communication standards including: Ethernet, IEEE 1394, and Fibre Channel;

wherein the network interface is configured to establish a connection with the server at power-on, and wherein the network interface is configured to establish the connection with the server when it receives the user input signal if the connection with the server is not established;

a DVD multimedia bitstream decoder coupled to the network interface to receive the DVD-compliant multimedia bit stream and configured to convert the DVD-compliant multimedia bitstream into a digital video signal;

a display controller coupled to the DVD multimedia bitstream decoder to receive the digital video signal and configured to responsively provide a display signal to a display screen;

an audio digital-to-analog converter, wherein the DVD-compliant multimedia bitstream includes an audio program, wherein the DVD multimedia bitstream decoder decodes the audio program into a digital audio signal, and wherein the audio digital-to-analog converter responsively provides an audio output signal;

a second encoded multimedia terminal coupled to the encoded multimedia server to communicate a second user input signal to the encoded multimedia server and to receive a second multimedia bitstream, wherein the second encoded multimedia terminal is configured to receive input from a second user-input device and configured to responsively determine the second user input signal, and wherein the second encoded multimedia terminal is configured to convert the second multimedia bitstream into a second display signal for a second display screen;

wherein the first encoded multimedia terminal is one of a plurality of encoded multimedia terminals coupled to the multimedia server; and a second encoded multimedia server coupled to the encoded multimedia terminal to receive the user input signal and configured to execute a second software application associated with the encoded multimedia terminal, wherein the second software application processes the user input and responsively updates a second video display, and wherein the second encoded multimedia server is configured to convert the video display into a third multimedia bitstream for communication to the encoded multimedia terminal.

* * * * *